(12) United States Patent
Grindstaff et al.

(10) Patent No.: US 7,859,569 B2
(45) Date of Patent: Dec. 28, 2010

(54) REAL-TIME IMAGE STABILIZATION

(75) Inventors: Gene A. Grindstaff, Decatur, AL (US); Sheila G. Whitaker, Gurley, AL (US)

(73) Assignee: Intergraph Technologies Company, Las Vegas, NV (US)

( * ) Notice: Subject to any disclaimer, the term of this patent is extended or adjusted under 35 U.S.C. 154(b) by 836 days.

(21) Appl. No.: 11/209,172

(22) Filed: Aug. 22, 2005

(65) Prior Publication Data

US 2006/0061661 A1 Mar. 23, 2006

Related U.S. Application Data

(60) Provisional application No. 60/603,768, filed on Aug. 23, 2004.

(51) Int. Cl.
*H04N 5/228* (2006.01)
*G06K 9/00* (2006.01)
*G06K 9/32* (2006.01)

(52) U.S. Cl. .............. 348/208.99; 348/208.4; 348/208.6; 382/165; 382/293; 382/295

(58) Field of Classification Search .......... 348/ 208.99–208.16; 396/172; 382/293–301
See application file for complete search history.

(56) References Cited

U.S. PATENT DOCUMENTS 4,719,584 A * 1/1988 Rue et al. ............... 348/171
6,167,167 A * 12/2000 Matsugu et al. ........ 382/283
6,215,519 B1 * 4/2001 Nayar et al. ............ 348/159
6,233,007 B1 5/2001 Carlbom et al.

(Continued)

FOREIGN PATENT DOCUMENTS

EP 0671147 A1 1/1995

(Continued)

OTHER PUBLICATIONS

Jordao L. et al., Sep. 27, 1999, "Active face and feature tracking" Image Analysis and processing, 1999. Proceedings International Conference on Venice, Italy Sep. 27-29, 1999, Los Alamitos, CA, USA, *IEEE* Comput. Soc, US, pp. 572-576, XP010354237 p. 572-p. 574.

(Continued)

*Primary Examiner*—Jason Chan
*Assistant Examiner*—Pritham Prabhakher
(74) *Attorney, Agent, or Firm*—Sunstein Kann Murphy & Timbers LLP

(57) ABSTRACT

An apparatus and method for stabilizing image frames in a video data stream. A weighted average or centroid of the intensity or hue associated with pixels vs. the horizontal and vertical position of each pixel is calculated for a reference frame in the video data stream. A corresponding centroid is calculated for a subsequent frame in the stream. This image frame is then translated so that the centroid of the subsequent frame and the centroid of the reference frame coincide, reducing artifacts from shaking of the video capture device. Alternatively, the video stream frames may be divided into tiles and centroids calculated for each tile. The centroids of the tiles of a subsequent frame are curve fit to the centroids of tiles in a reference frame. An affine transform is then performed on the subsequent frame to reduce artifacts in the image from movements of the video capture device.

10 Claims, 6 Drawing Sheets

U.S. PATENT DOCUMENTS

| | | | |
|---|---|---|---|
| 6,377,626 B1 * | 4/2002 | Hatabu | 375/240.1 |
| 6,556,708 B1 * | 4/2003 | Christian et al. | 382/165 |
| 6,560,375 B1 * | 5/2003 | Hathaway et al. | 382/295 |
| 6,591,011 B1 * | 7/2003 | Nielsen | 382/218 |
| 7,016,532 B2 * | 3/2006 | Boncyk et al. | 382/165 |
| 7,038,709 B1 * | 5/2006 | Verghese | 348/169 |
| 7,409,092 B2 * | 8/2008 | Srinivasa | 382/199 |
| 2002/0048393 A1 * | 4/2002 | Oosawa | 382/132 |
| 2003/0048359 A1 * | 3/2003 | Fletcher et al. | 348/208.6 |
| 2004/0032906 A1 | 2/2004 | Lillig | 375/240.08 |
| 2005/0084178 A1 * | 4/2005 | Lure et al. | 382/294 |
| 2005/0163348 A1 * | 7/2005 | Chen | 382/107 |
| 2006/0152590 A1 | 7/2006 | Kage et al. | |

FOREIGN PATENT DOCUMENTS

| | | |
|---|---|---|
| GB | 2 242 590 | 10/1991 |
| GB | 2242590 * | 10/1991 |
| JP | 04-287579 | 10/1992 |
| JP | 06-038091 | 2/1994 |
| WO | WO 00/73996 | 12/2000 |
| WO | WO 02/29544 | 4/2002 |
| WO | WO2004/062270 | 7/2004 |

OTHER PUBLICATIONS

Francesco Ziliani, Nov. 1, 2000, "Spatio-temporal image segmentation: a new rule based approach" These Science Techniques EPFL, 'Online!, XP002363133 EPFL, Lausanne Retrieved from the Internet: URL:http://ltslpc19.epfl.ch/repository/Zil iani2000_665.pdf>retrieved on Jan. 17, 2006!, pp. 77-78; figure 4.9; p. 108; figure 5.13; p. 112; figure 5.15,5.19.

URL: http://ltslpc19.epfl.ch/repository/Zil iani2000_655.pdf> retrieved on Jan. 17, 2006!, pp. 77-78; figure 4.9; p. 108; figure 5.13; p. 112; figure 5.15,5.19.

Australian Patent Office, Examiner's Report No. 2—Application No. 2005277136, dated Mar., 29 2010 (12 pages).

* cited by examiner

REAL-TIME IMAGE STABILIZATION

This application claims priority from U.S. provisional patent application No. 60/603,768, filed Aug. 23, 2004, entitled "Real-Time Image Stabilization," which is incorporated herein by reference.

TECHNICAL FIELD

The invention generally relates to image processing and, more particularly, the invention relates to image stabilization.

BACKGROUND ART

Image data, such as a video data stream, often can have artifacts introduced when a data capture device (e.g., a video camera) shakes while recording or otherwise capturing the image. Removal of such artifacts improves image fidelity.

SUMMARY OF THE INVENTION

In various embodiments of the invention, an apparatus and method stabilize video in real-time. In one embodiment of the invention, weighted averages as a function of position of the intensity or the hue associated with pixels in a video image are calculated. The weighted average in the horizontal and in the vertical determine a location in the image called a centroid. The centroid is first calculated for a reference frame of the video data stream. Subsequent frames of the video are then translated so that their centroids coincide with the centroid of the reference frame. Thus, artifacts in the image due to camera "shake" are removed. In another embodiment of the invention, the video image frame is broken into regions or tiles. As before, the centroids of the tiles in a reference video image frame are calculated. Subsequent frame's tiles' centroids are calculated. A simple curve fitting technique is used to determine the affine transform that will cause the image to coincide with the reference image. This embodiment of the invention can deal effectively with motion of the video capture device or camera that involves translation and rotation in a plurality of directions simultaneously.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Brief Description of the Drawings

The foregoing features of the invention will be more readily understood by reference to the following detailed description, taken with reference to the accompanying drawing, in which:

FIGS. 1A, 1B, 1C and 1D shows an exemplary process of stabilizing a motion picture in accordance with an illustrative embodiment of the invention.

Figure 2:
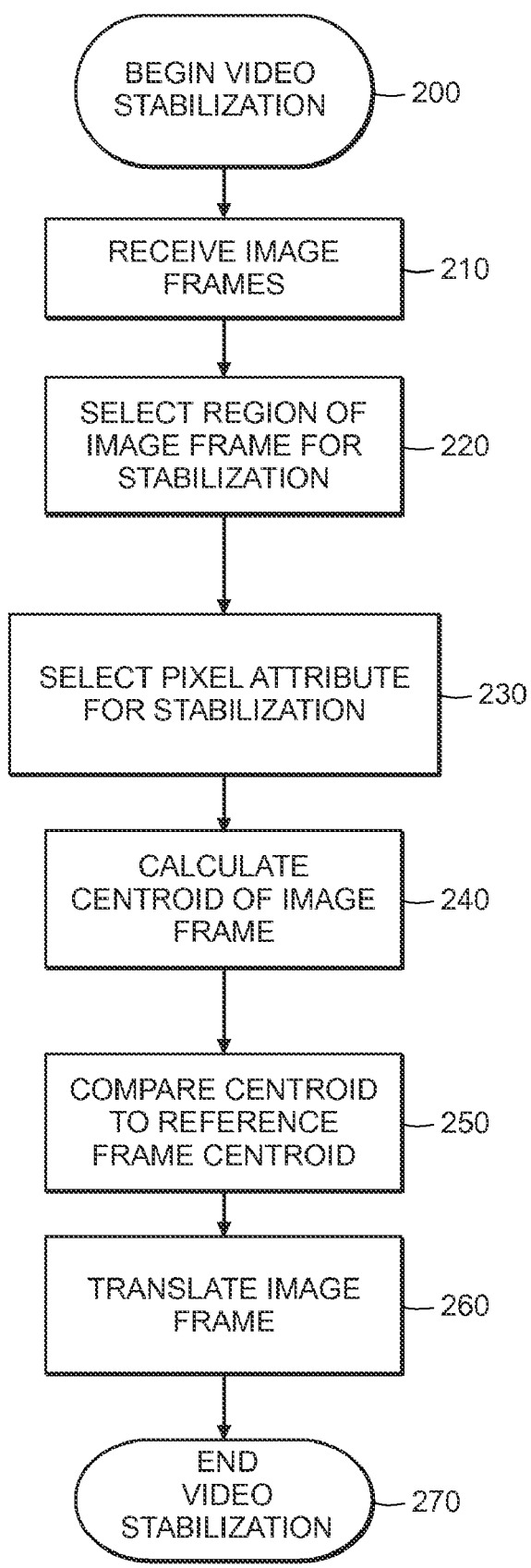

FIG. 2 is a flow diagram for a method for stabilizing images in a video stream in accordance with an embodiment of the invention.

Figure 3:
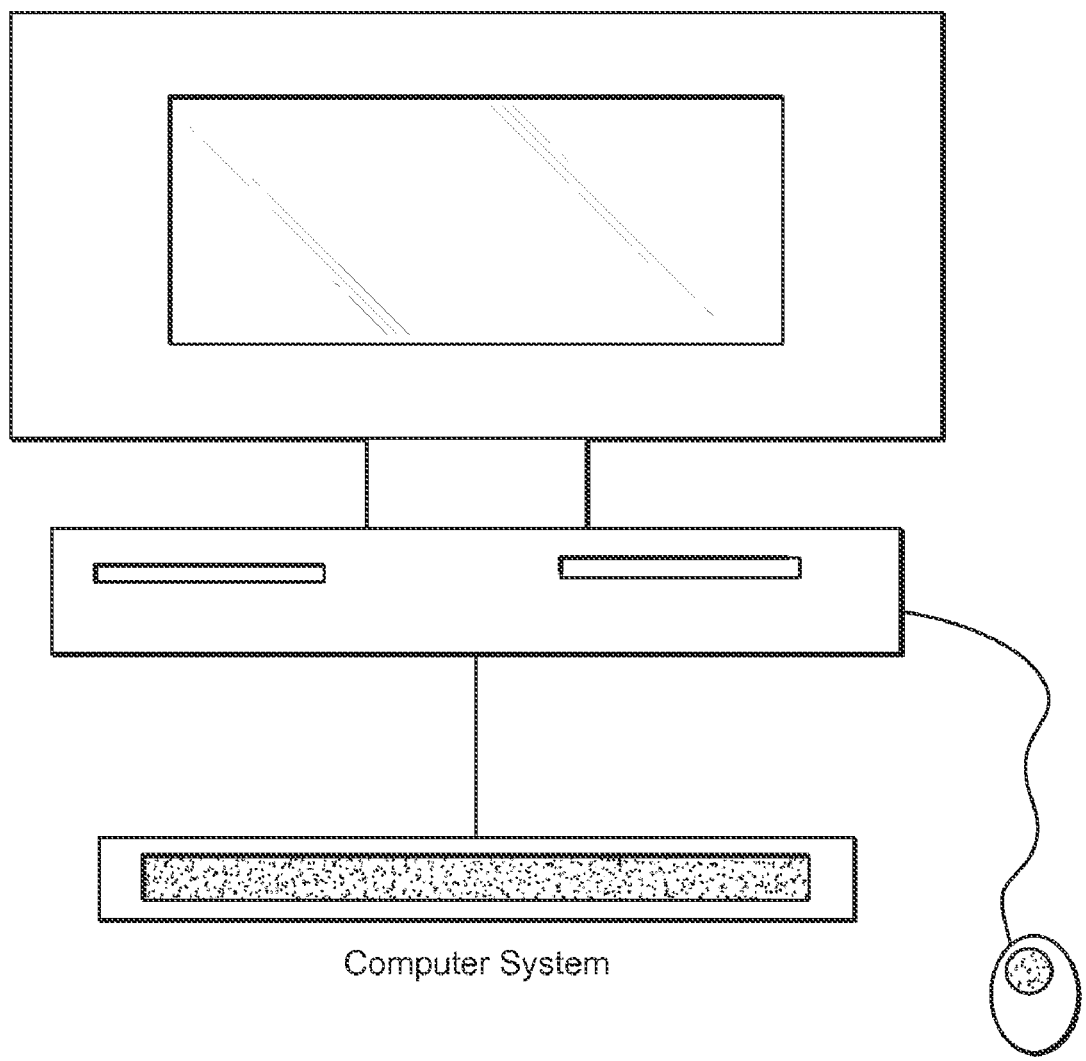

FIG. 3 shows a computer used to calculate a centroid of a given image frame in the video data stream.

DETAILED DESCRIPTION OF SPECIFIC EMBODIMENTS

In various embodiments of the invention, an apparatus and method stabilize video in real-time. In one embodiment of the invention, weighted averages as a function of position of the intensity or the hue associated with pixels in a video image are calculated. The weighted averages in the horizontal and in the vertical determine a location in the image called a centroid. The centroid is first calculated for a reference frame of the video data stream. Subsequent frames of the video are then translated so that their centroids coincide with the centroid of the reference frame. Thus, artifacts in the image due to camera "shake" are removed. In another embodiment of the invention, the video image frame is broken into regions or tiles. As before, the centroids of the tiles in a reference video image frame are calculated. Subsequent frame's tiles' centroids are calculated. A simple curve fitting technique is used to determine the affine transform that will cause the image to coincide with the reference image. This embodiment of the invention can deal effectively with motion of the camera that involves translation and rotation in a plurality of directions simultaneously.

Illustrative embodiments of the invention may be implemented as a computer program product having a computer usable medium with computer readable program code thereon. The computer readable code may be read and utilized by a computer system in accordance with conventional processes. Details of illustrative embodiments are discussed below.

System Operation

In an embodiment of the invention, as shown in FIG. 2, the centroid stabilization module 200 receives video from a capture or streaming device 210. Each frame is processed and passed to an output device for viewing or recording. Other routines may process the video either prior to or after the centroid stabilization routine. In some embodiments, the centroid stabilization module includes parameters that allow a user to select a region of the video frame on which to apply stabilization processing 220. For example, the user can specify a rectangle on the viewing screen that describes the rows and columns that the centroid routine will perform calculations upon. The user may also specify whether the intensity or hue will be used to stabilize the image 230. (It should be noted that rather than the intensity or hue, other qualities of the image, which may be associated with each pixel, may be used. Accordingly, discussion of intensity or hue is illustrative and not intended to limit various embodiments of the invention.) In specific embodiments, the user may specify a range of values for which the calculations will be performed. For intensity, the user typically can specify any range between 0 and 255. Similarly the hue may be all ranges of color, or a specific range of colors may be chosen. The hue values are typically also 0 to 255 and represent an angle from 0 to 360 degrees.

Centroid Calculation

The centroid is calculated using a weighted average. The centroid is defined as follows:

$$X \text{ centroid} = \frac{\text{Sum}(ColumnNumberOfPixel * ValueOfPixel)}{\text{Sum}(ValueOfPixel)}$$

$$Y \text{ centroid} = \frac{\text{Sum}(RowNumberOfPixel * ValueOfPixel)}{\text{Sum}(ValueOfPixel)}$$

The ValueOfPixel could be the intensity or hue of the pixel or another value calculated from appropriate attributes of each pixel. The summation takes place over the user defined range of interest which may be all or just a portion of the video frame. The centroid of the image is then compared to the centroid of a reference frame that has been previously calculated 250. The image is then translated in the X and Y direction as needed so that the centroid of the image and the centroid of the reference image coincide 260, 270. These operations are then repeated on subsequent images in the video stream.

Figure 1:
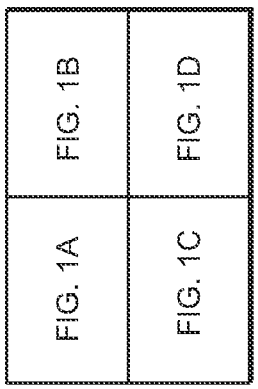
Figure 1A:
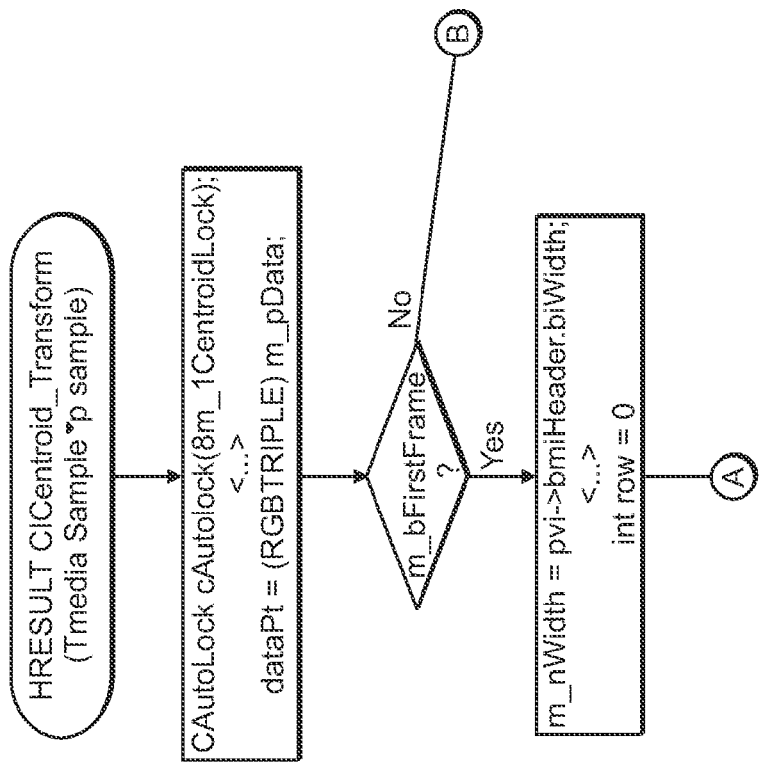
Figure 1B:
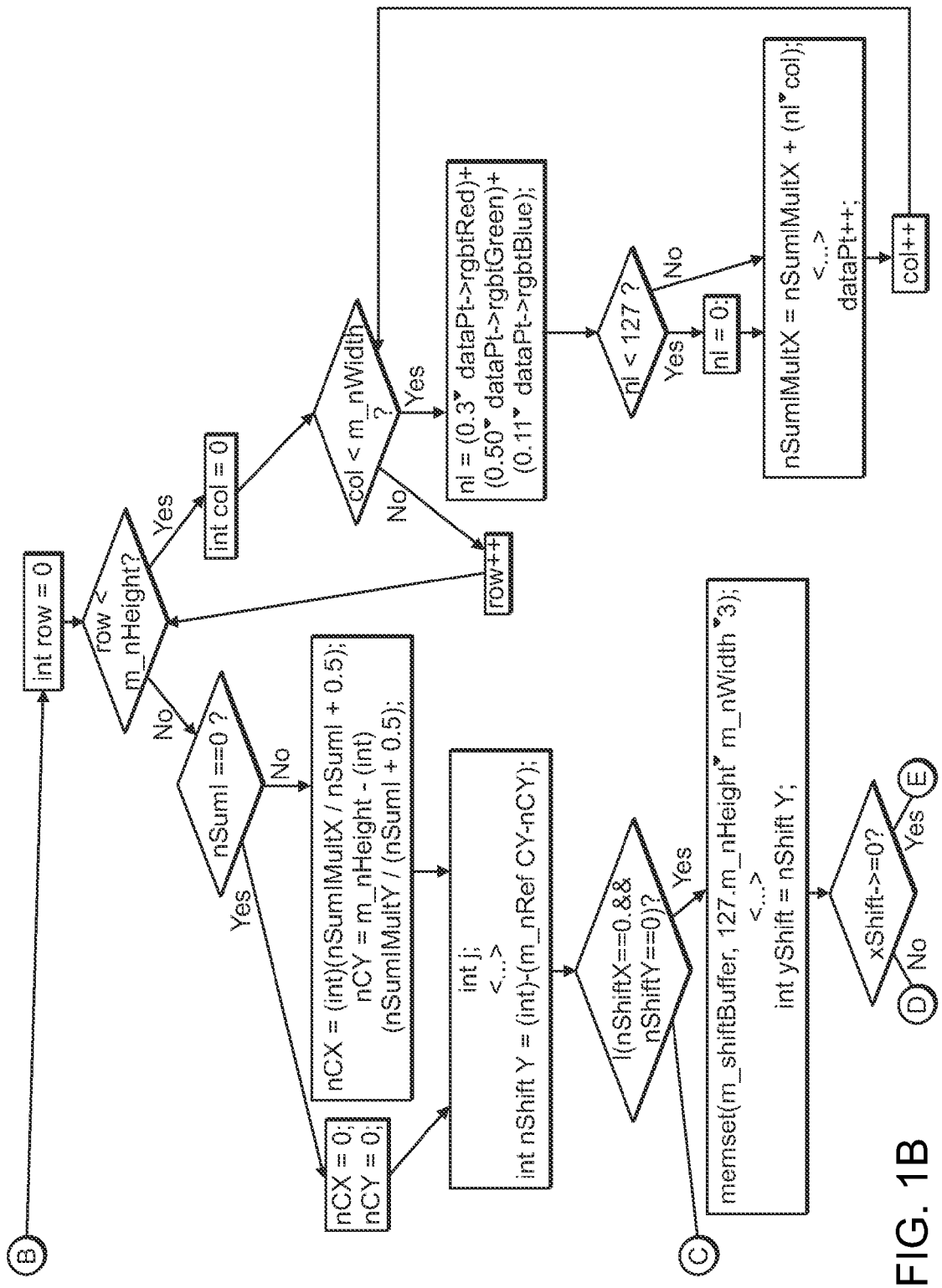
Figure 1C:
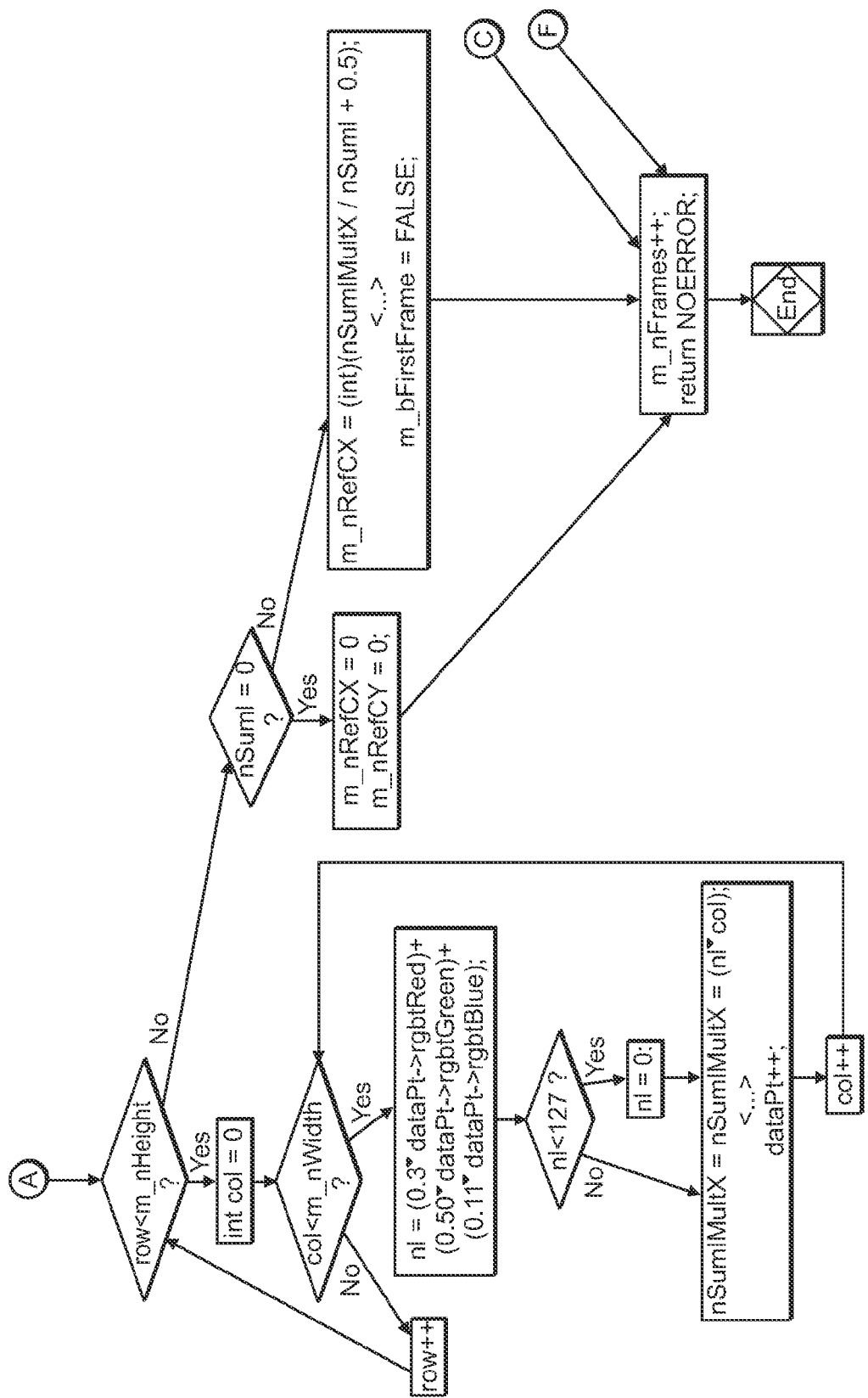
Figure 1D:
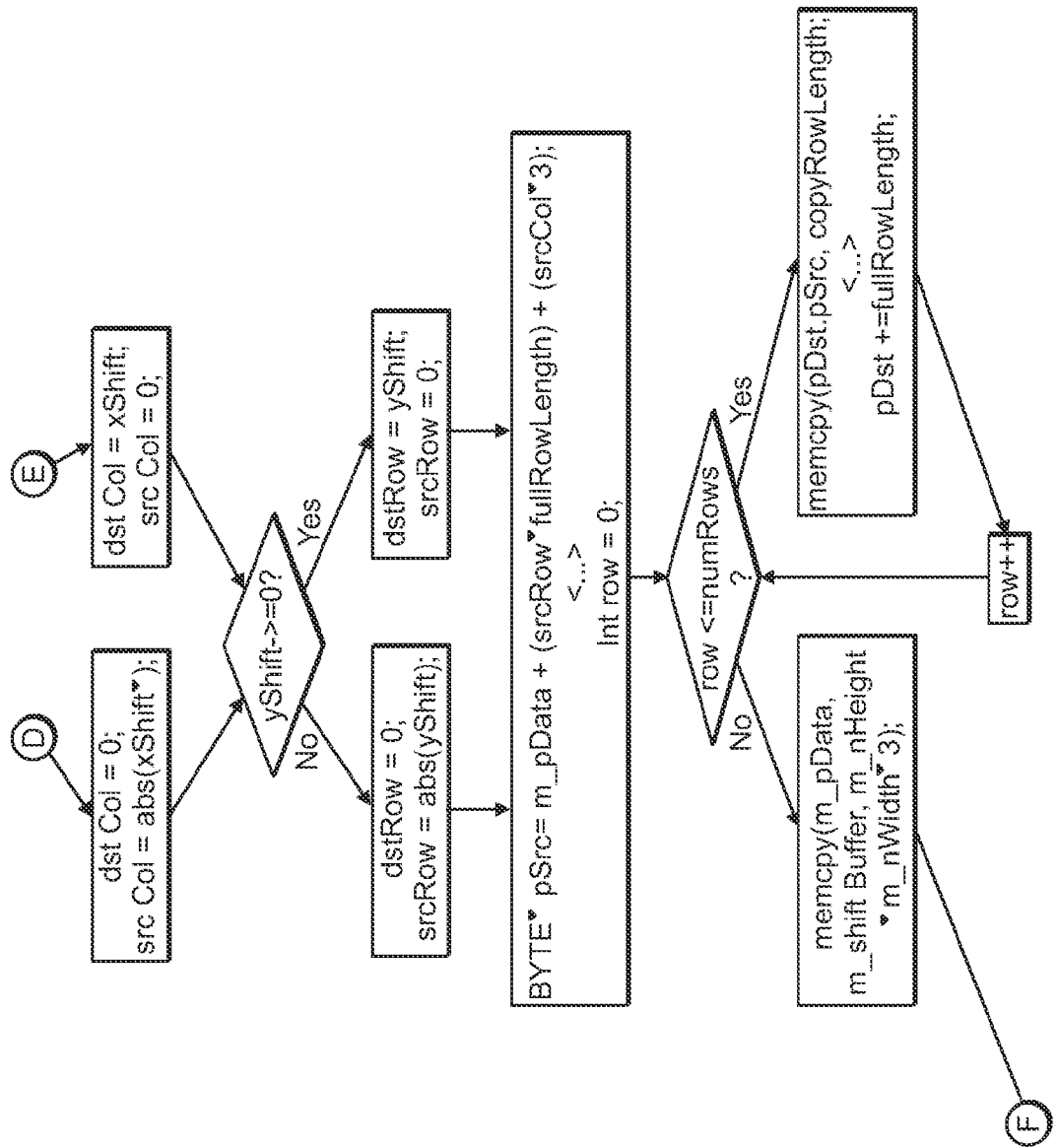

FIG. 1 is a flow chart of an embodiment of the invention, which calculates a single centroid for each frame. A flowcharting tool generated this flowchart from actual code of that embodiment. The flowchart illustrates the flow of calculating the intensity centroid and the shift mechanism. Accordingly, those skilled in the art should be able to reproduce the flow chart in software Curve Fitting To deal with complex motion of the video capture source, the image is broken into tiles. Each tile's centroid is then calculated as above. The movement of each tile's centroid is compared to corresponding centroids in a reference frame. These values are input into a curve fitting routine that determines the values of an affine transform. The transform accounts for translation, scale, rotation, yaw, and pitch. If a successful calculation of each of these values is made, then the video frame is passed to a transformation routine that rotates, scales, and translates the image appropriately. If a solution to the curve fit is not found, then the points of the reference frame are correlated against the points of the current frame. The "N" by "N" correlation yields the highest correlation of points. All points that are above a user selected threshold are used to establish a curve fit. If all attempts to establish a curve fit fail, then a new reference frame is established, and the process starts over.

It should be noted that discussion of video data streams is exemplary and not intended to limit the scope of all embodiments. Rather, various embodiments apply to image data that can be represented graphically and recorded to some medium. In illustrative embodiments, the image data is recordable in 2D. Further, in various embodiments of the invention, the system can cause a new reference image frame to be designated periodically and its centroid or centroids calculated. This can be done based on a time parameter, the amount of translation of the image frames that occurs, or some other criterion.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In some embodiments, the disclosed apparatus and methods may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A computer-implemented method for stabilizing image frames in a video data stream comprising:
   a. using a computer, calculating a centroid of a given image frame in the video data stream, the centroid consisting of a weighted average of a value associated with each pixel as a function of the pixel's position in the image frame for at least a portion of the image frame, the portion situated at the same vertical and horizontal position in each image frame in the video data stream, wherein the value associated with a given pixel is eliminated from the centroid calculation when the value is outside a selected range of values; and
   b. using the computer, translating the given image frame by an amount equal to the difference in position between the centroid of the portion of the given image frame and the centroid of the same portion of a reference image frame, where the value associated with each pixel is one of a hue, an intensity or another quality of the image and the weighted average of a value associated with each pixel is defined as:

$$X \text{ centroid} = \frac{Sum(CloumnNumberOfPixel * ValueOF\ Pixel)}{Sum(ValueOfPixel)}$$

$$Y \text{ centroid} = \frac{Sum(RowNumberOf\ Pixel * ValueOfPixel)}{Sum(ValueOfPixel)}.$$

2. A method according to claim 1, wherein the value associated with each pixel is one of a hue and an intensity.

3. A method according to claim 1 further including:
   c. using the computer, updating the reference image frame to a subsequent image frame in the video data stream.

4. A method according to claim 3 wherein the distance the given image frame has been translated determines updating the reference image frame.

5. A method according to claim 1, wherein the portion of the given image frame is approximately equal to the entire given image frame.

6. A computer program product for use on a computer system for stabilizing image frames in a video data stream, the computer program product comprising a tangible computer readable medium having computer readable program code thereon, the computer readable program code including:

a. program code for calculating a centroid of a given image frame in the video data stream, the centroid consisting of a weighted average of a value associated with each pixel as a function of the pixel's position in the image frame for at least a portion of the image frame, the portion situated at the same vertical and horizontal position in each image frame in the video data stream, wherein the value associated with a given pixel is eliminated from the centroid calculation when the value is outside a selected range of values; and b. program code for translating the given image frame by an amount equal to the difference in position between the centroid of the portion of the given image frame and the centroid of the same portion of a reference image frame, where the value associated with each pixel is one of a hue, an intensity or another quality of the image and the weighted average of a value associated with each pixel is defined as:

$$X \text{ centroid} = \frac{\text{Sum}(ClournNumberOfPixel * ValueOF \text{ Pixel})}{\text{Sum}(ValueOfPixel)}$$

$$Y \text{ centroid} = \frac{\text{Sum}(RowNumberOf \text{ Pixel} * ValueOfPixel)}{\text{Sum}(ValueOfPixel)}.$$

7. A computer program product according to claim 6, wherein the value associated with each pixel is one of a hue and an intensity.

8. A computer program product according to claim 6, further including:

c. program code for updating the reference image frame to a subsequent image frame in the video data stream.

9. A computer program product according to claim 8, wherein the distance the given image frame has been translated determines updating the reference image frame.

10. A computer program product according to claim 6, wherein the portion of the given image frame is approximately equal to the entire given image frame.

* * * * *

UNITED STATES PATENT AND TRADEMARK OFFICE
CERTIFICATE OF CORRECTION

PATENT NO. : 7,859,569 B2  
APPLICATION NO. : 11/209172  
DATED : December 28, 2010  
INVENTOR(S) : Gene A. Grindstaff et al.

Page 1 of 1

It is certified that error appears in the above-identified patent and that said Letters Patent is hereby corrected as shown below:

In Col. 4, line 46  
replace "Sum(CloumnNumberOfPixel*ValueOFPixel)"  
with "Sum(ColumnNumberOfPixel*ValueOfPixel)."

In Col. 5, line 20  
replace "Sum(CloumnNumberOfPixel*ValueOFPixel)"  
with "Sum(ColumnNumberOfPixel*ValueOfPixel)."

Signed and Sealed this  
Eighth Day of March, 2011

David J. Kappos  
*Director of the United States Patent and Trademark Office*